United States Patent
Prokhorov

(10) Patent No.: US 10,391,842 B2
(45) Date of Patent: Aug. 27, 2019

(54) AUTOMATICALLY DEPLOYABLE VEHICLE SHADE SYSTEM

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 272 days.

(21) Appl. No.: 15/292,110

(22) Filed: Oct. 12, 2016

(65) Prior Publication Data

US 2018/0099545 A1   Apr. 12, 2018

(51) Int. Cl.
*B60J 3/00*   (2006.01)

(52) U.S. Cl.
CPC ......... *B60J 3/002* (2013.01); *B60Y 2410/114* (2013.01)

(58) Field of Classification Search
USPC .......................................................... 701/49
See application file for complete search history.

(56) References Cited

U.S. PATENT DOCUMENTS

| | | | | |
|---|---|---|---|---|
| 4,775,180 A * | 10/1988 | Phillips | ................. | B60J 1/2091 160/370.23 |
| 4,950,020 A * | 8/1990 | Chen | ....................... | B60J 11/00 296/136.02 |
| 5,269,360 A * | 12/1993 | Chen | ....................... | B60J 1/2091 160/84.06 |
| 5,657,810 A * | 8/1997 | Levy | .......................... | B60J 1/20 160/134 |
| 5,762,393 A | 6/1998 | Darmas, Sr. | | |
| 6,152,206 A * | 11/2000 | Chen | ....................... | B60J 1/2091 160/370.23 |
| 6,206,451 B1 * | 3/2001 | Maano | ..................... | B60J 11/00 296/136.04 |
| 6,666,493 B1 * | 12/2003 | Naik | ..................... | B60J 3/0204 296/97.4 |
| 6,811,201 B2 | 11/2004 | Naik | | |
| 8,104,820 B2 * | 1/2012 | Browne | ................. | B60J 11/025 160/370.23 |
| D708,588 S * | 7/2014 | Ikegaya | ...................... | D13/168 |
| 2010/0123023 A1 * | 5/2010 | Schnuckle | ............ | A45B 27/00 239/289 |

(Continued)

Primary Examiner — Anne M Antonucci
Assistant Examiner — James E Stroud
(74) Attorney, Agent, or Firm — Christopher G. Darrow; Darrow Mustafa PC

(57) ABSTRACT

A computing system for a vehicle includes one or more processors and a memory for storing data and program instructions usable by the one or more processors. The one or more processors are configured to execute instructions stored in the memory to determine if a virtual straight line connecting a predetermined location within a vehicle with a light source external to the vehicle passes through a window of the vehicle. If the straight line passes through a window, it is determined if the straight line will pass through any deployable vehicle shade if the shade is deployed. If the straight line will pass through a shade if the shade is deployed and the shade through which the straight line will pass is not already deployed, the vehicle may be operated so as to deploy the shade through which the straight line will pass if the shade is deployed.

19 Claims, 12 Drawing Sheets

(56) References Cited

U.S. PATENT DOCUMENTS

| | | | |
|---|---|---|---|
| 2015/0224856 A1* | 8/2015 | Snider | B60J 1/2019 |
| | | | 296/152 |
| 2016/0221429 A1* | 8/2016 | Yip | B60J 11/08 |
| 2016/0243975 A1* | 8/2016 | Singer | B60P 7/04 |
| 2017/0210208 A1* | 7/2017 | Zhang | B60J 3/02 |
| 2017/0349037 A1* | 12/2017 | Singer | B60J 7/041 |
| 2018/0029597 A1* | 2/2018 | Gage | B60W 30/182 |
| 2018/0099550 A1* | 4/2018 | Babbage | B60J 11/06 |

* cited by examiner

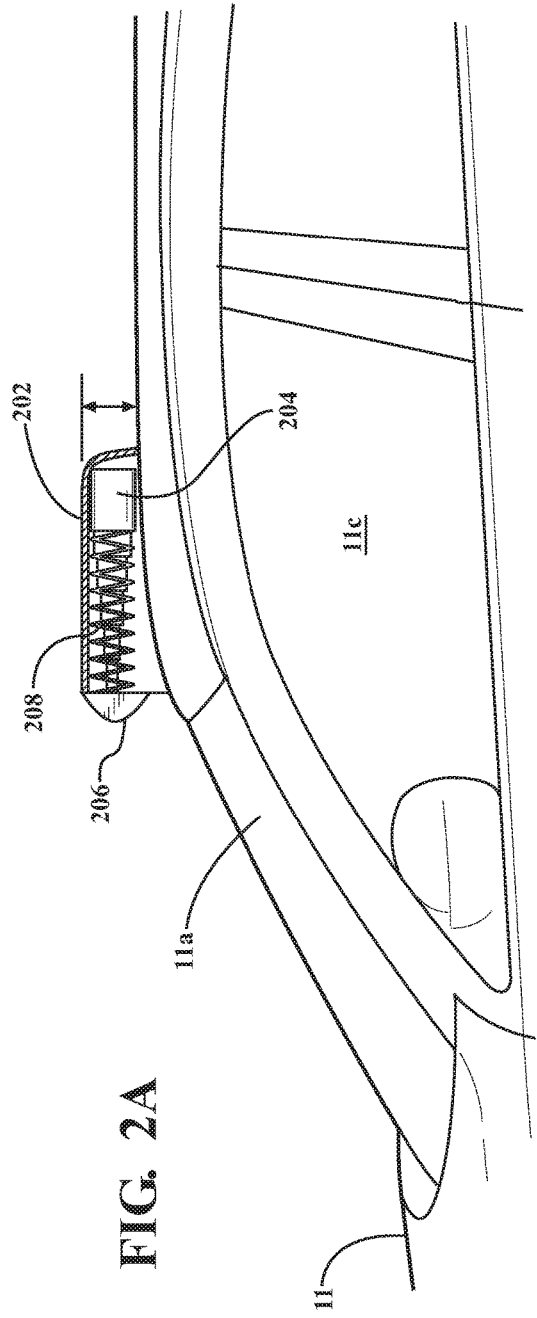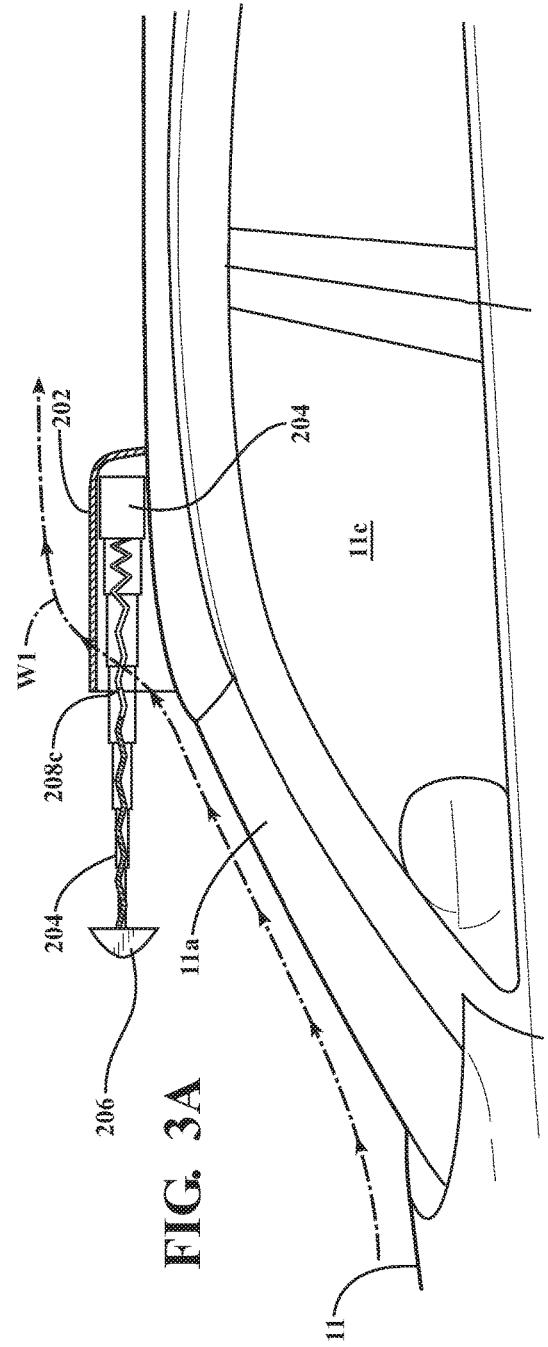

US 10,391,842 B2

AUTOMATICALLY DEPLOYABLE VEHICLE SHADE SYSTEM

TECHNICAL FIELD

The present invention relates to shades mountable on vehicles and deployable to mitigate the impact of sunlight and other external lights sources on driver vision.

BACKGROUND

Direct sunlight and glare arising from diffusion of light striking front windshields and other windows may interfere with a driver's vision during driving. Various types of shades may be applied to cover the vehicle windows, to mitigate the effects of sunlight on driving. However, various problems exist with such shades. For example, manually actuated shades may not be retractable if they are no longer needed, when the vehicle is moving. Also, shades mounted in the vehicle interior and which reside closely to the window surface may be unsightly and take up space in the passenger compartment. Moreover, semi-transparent shades in the vehicle interior (i.e., sun visors, etc.) do nothing to mitigate glare arising from light diffusion on the windshield, and only exacerbate the driver's difficulties in seeing outside the window.

SUMMARY

In one aspect of the embodiments described herein, a computing system for a vehicle is provided. The computing system includes one or more processors for controlling operation of the computing system, and a memory for storing data and program instructions usable by the one or more processors. The one or more processors are configured to execute instructions stored in the memory to determine if a virtual straight line connecting a predetermined location within a vehicle with a light source external to the vehicle passes through a window of the vehicle. The one or more processors are configured to execute instructions stored in the memory to, if the straight line passes through a window of the vehicle, determine if the straight line will pass through any deployable vehicle shade if the shade is deployed. The one or more processors are configured to execute instructions stored in the memory to, if the straight line will pass through any deployable vehicle shade if the shade is deployed and the shade through which the straight line will pass is not already deployed, operate the vehicle so as to deploy the shade through which the straight line will pass if the shade is deployed.

In another aspect of the embodiments described herein, a shade system is provided. The shade system is structured to be actuatable to block or attenuate light emanating from an extra-vehicular light source so as to shine through a window to a predetermined location in an interior of a vehicle. The shade system includes a housing, at least one deployable shade mounted in the housing, and at least one deployment mechanism coupled to the at least one shade and operable to move the at least one shade between a deployed condition and a stowed condition.

In another aspect of the embodiments described herein, a method is provided for operating a vehicle incorporating one or more automatically deployable vehicle shades. The method includes steps of determining a direction of an external light source relative to a predetermined location within the vehicle, constructing a virtual straight line connecting the external light source with a predetermined location within the vehicle; determining if the straight line connecting the predetermined location with the external light source passes through a window of the vehicle; if the straight line passes through a window of the vehicle, determining if the straight line will pass through any deployable vehicle shade if the shade is deployed; if the straight line will pass through a deployable vehicle shade if the shade is deployed, determining if the vehicle shade through which the straight line will pass is already deployed; and if the shade through which the straight line will pass is not already deployed, operating the vehicle so as to deploy the shade through which the straight line will pass if the shade is deployed.

BRIEF DESCRIPTION OF THE DRAWINGS

FIG. 2A is a schematic side cross-sectional view of the shade system as shown in FIG. 2.

FIG. 3A is a schematic side cross-sectional view of the shade system as shown in FIG. 3.

DETAILED DESCRIPTION

Embodiments described herein relate to a shade system for a vehicle. Shades of the shade system are designed to extend above associated windows of the vehicle when deployed. The vehicle may be configured to detect situations where light from a light source (such as the Sun) exterior of the vehicle shines along a virtual straight line extending between the light source and a predetermined location inside the vehicle (for example, a location specified to approximate eye level on the face of a driver seated in an upright driving position in the driver's seat). The vehicle may also be configured to determine if any deployable shade mounted on the vehicle would, if deployed, intersect the virtual line, thereby attenuating or blocking the light. The vehicle may also be configured to, if deployment of a shade would intersect the virtual line, automatically deploy the shade. Deployment of the shade may also be manually controllable.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
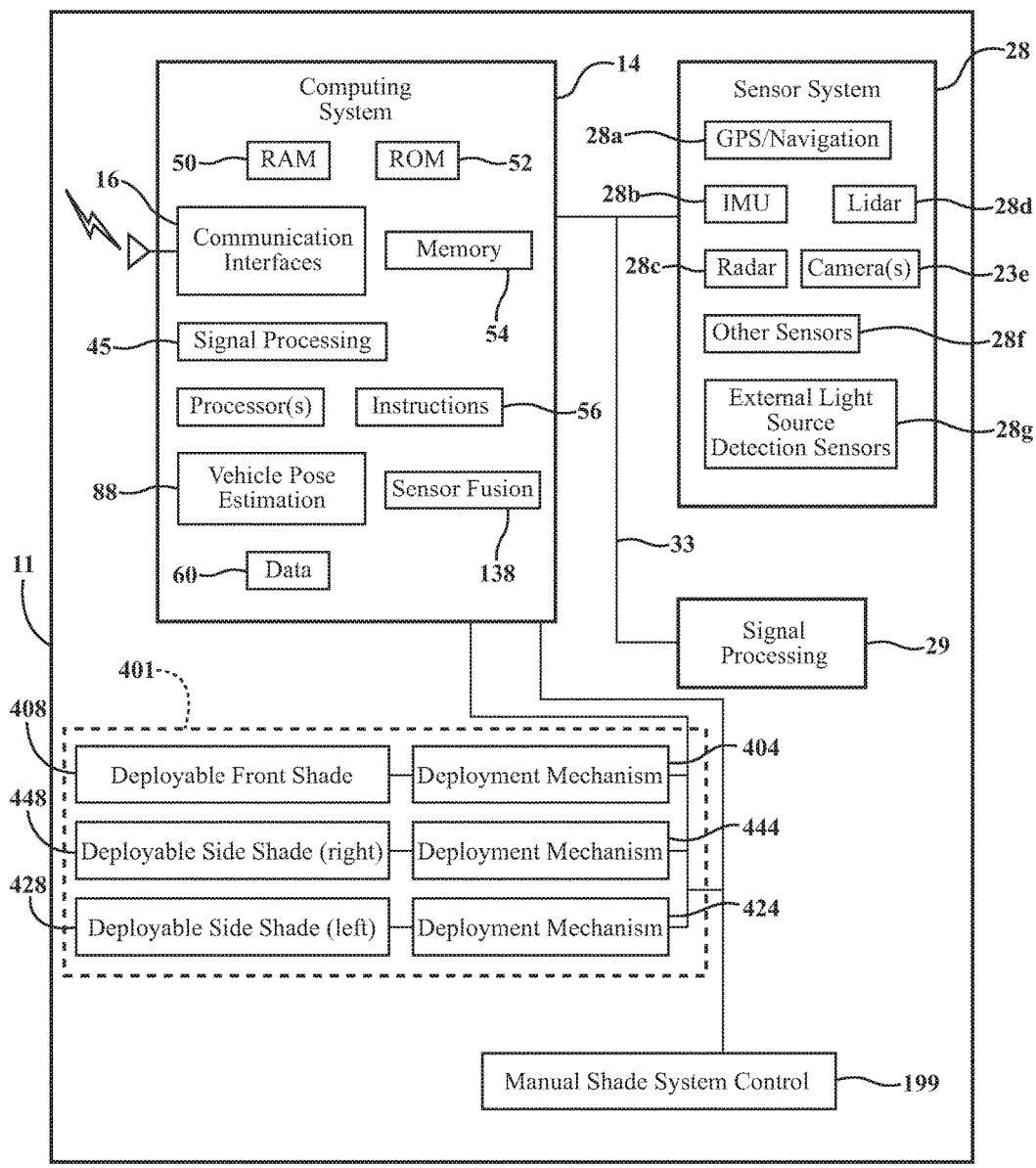
FIG. 1 is a functional block diagram illustrating a vehicle in accordance with an example embodiment described herein.

FIG. 1 is a functional block diagram illustrating a vehicle 11 in accordance with an example embodiment. The vehicle 11 may take the form of a car, truck, or other vehicle having an enclosed passenger compartment with a front windshield and side and rear windows. The vehicle 11 may include various systems, subsystems and components operatively connected to each other, such as a sensor system or array 28, a computing system 14, one or more communications interfaces 16, a signal processing means 29, an embodiment (for example, embodiment 401 described herein) of an actuatable shade system, a manual shade system control 199, and any other systems and components needed for operating the vehicle as described herein. FIG. 1 shows shade system 401 of FIG. 5 incorporated into the vehicle. However, any of the other shade system embodiments described herein may be incorporated into the vehicle 11 and operatively connected to various shade system control means in a similar manner. The vehicle 11 may include more or fewer subsystems and each subsystem could include multiple elements. Further, each of the subsystems and elements of vehicle 11 may be interconnected. Various actuatable sub-systems and elements may be controlled automatically by computing system 14 or manually.

In a known manner, the vehicle sensor system 28 provides data used by the computing system 14 in formulating and executing suitable control commands for the various vehicle systems. For example, information from the various sensors may be processed in formulating and executing commands to deploy and retract the various shade system embodiments described herein. Various examples of different types of sensors are described herein. However, it will be understood that the embodiments are not limited to the particular sensors described, and that the sensor system 28 can include any type of sensor needed to perform the functions and operations described herein. In arrangements in which the sensor system 28 includes a plurality of sensors, the sensors can work independently from each other. Alternatively, two or more of the sensors can work in combination with each other. Sensors of the sensor system 28 can be operatively connected to the computing system 14 and/or any other element of the vehicle 11.

The sensor system 28 may include a number of sensors configured to sense information about the vehicle and an external environment of the vehicle 11. Such information is usable by the computing system 14 in formulating and executing suitable control commands. For example, the sensor system 28 may include a navigation unit or system 28a such as a Global Positioning System (GPS), an inertial measurement unit (IMU) 28b, a RADAR unit 28c, a laser rangefinder/LIDAR unit 28d, and one or more cameras 28e comprising devices configured to capture a plurality of images of an external environment of the vehicle 11. The camera(s) 28e may be still cameras or video cameras. The IMU 28b may incorporate any combination of sensors (e.g., accelerometers and gyroscopes) configured to sense position and orientation changes of the vehicle 11 based on inertial acceleration. For example, the IMU may sense such parameters as vehicle roll rate, yaw rate, pitch rate, longitudinal acceleration, lateral acceleration, and vertical acceleration. The GPS or navigation unit 28a may be any sensor or group of sensors configured to estimate a geographic location of the vehicle 11. To this end, the navigation unit 28a may include a one or more transceivers, including a transceiver operable to provide information regarding the position of the vehicle 11 with respect to Earth. One or more of the sensors included in the sensor system 28 may be configured to be actuated separately or collectively in order to modify a position, an orientation, or both, of the one or more sensors.

Any data collected by sensor system 28 may also be transmitted to any vehicle system or component requiring or utilizing the data for the purposes described herein. For example, the data collected by sensor system 28 may be transmitted to computing system 14 or to one or more specialized system or component controllers (not shown).

If a sensor output signal or other signal may require pre-processing prior to use by the computing system or another vehicular (or extra-vehicular) system or element, a known or suitable signal processing means 29 (for example, an analog-to-digital (A/D) converter or digital-to-analog (D/A) converter) may be incorporated along a path between the sensor system (or the pertinent sensor(s)) and the pertinent system or element. Alternatively, the signal processing means may be incorporated into the pertinent system or element. Similarly, if operation of any actuatable sub-system or sub-system components (for example, components of a shade system as described herein) will require processing of a control signal received from the computing system prior to use, a known or suitable signal processing means (such as signal processing means 45) may be incorporated into the computing system or located along a path between the computing system 14 and the actuatable sub-system components. Alternatively, the signal processing means 45 may be incorporated into the pertinent sub-system or sub-system component.

The sensor fusion algorithm 138 may be an algorithm (or a computer program product storing an algorithm) configured to accept data from the sensor system 28 as an input. The data may include, for example, data representing information sensed at the sensors of the sensor system 28. The sensor fusion algorithm may process data received from the sensor system to generate an integrated or composite signal (formed, for example, from outputs of multiple individual sensors). The sensor fusion algorithm 138 may include, for instance, a Kalman filter, a Bayesian network, or a suitable data processing algorithm. The sensor fusion algorithm 138 may further provide various assessments based on data from the sensor system 28. In an example embodiment, the assessments may include evaluations of individual objects or features in the environment of the vehicle 11, evaluation of a particular situation, and evaluation of possible impacts based on the particular situation. Other assessments are possible. For example, the sensor fusion algorithm 138 may be configured to process information from external light detection sensors 28g, information from other sensors and/or other information to determine and update the direction of a light source external to the vehicle and with respect to location P1, for use in the vehicle shade deployment and retraction decisions described herein. The sensor fusion algorithm 138 may be stored on a memory (such as memory 54) incorporated into or operatively connected to computing system 14 or another computing system or device, and may be executed by the associated computing system or device in a manner known in the art.

The use of "continuously" when referring to the reception, gathering, monitoring, processing, and/or determination of any information or parameters described herein means that the computing system 14 may be configured to receive and/or process any information relating to these parameters on an ongoing basis, as soon as the information exists or is detected, or as soon as possible in accordance with sensor acquisition and processor processing cycles and given the time required to acquire and process the data or other information necessary to calculate, determine, and/or update the parameter. As soon as the computing system 14 receives data from sensors or information relating to the calculation or determination of the value of a parameter described herein, the computing system 14 may act in accordance with stored programming instructions. Similarly, the computing system may receive and process an ongoing or continuous flow of information from sensor system 28 and from other information sources. This information is processed and/or evaluated in accordance with instructions stored in a memory, in a manner and for the purposes described herein. Also, where stated herein that a computing system or other element of the vehicle is regularly calculating, determining, or updating a parameter, it is understood to mean that the parameter is being calculated, determined, and/or updated on a regular basis (for example, at a constant time interval).

FIG. 1 illustrates a block diagram of an exemplary computing system according to one or more illustrative embodiments of the disclosure. The computing system 14 may have some or all of the elements shown in FIG. 1. In addition to the elements shown in FIG. 1, the computing system 14 may include additional elements as needed or desired for particular applications. The computing system 14 may also be embodied in a plurality of controllers or computing devices that may process information and/or serve to control individual components or subsystems of the vehicle 11 in a distributed fashion.

The computing system 14 may include one or more processors 58 (which could include at least one microprocessor) for controlling overall operation of the computing system 14 and associated components, and which execute instructions stored in a non-transitory computer readable medium, such as the memory 54. "Processor" means any component or group of components that are configured to execute any of the processes and/or process steps described herein or any form of instructions to carry out such processes/process steps or cause such processes/process steps to be performed. The processor(s) 58 may be implemented with one or more general-purpose and/or one or more special-purpose processors. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other. In one or more arrangements, the processor(s) 58 can be a main processor of the vehicle 11. For instance, the processor(s) 58 can be part of an electronic control unit (ECU).

In some embodiments, the computing system 14 may include RAM 50, ROM 52, and/or any other suitable form of computer-readable memory. The memory 54 may comprise one or more computer-readable memories. A computer-readable storage or memory 54 includes any medium that participates in providing data (e.g., instructions), which may be read by a computer. Such a medium may take many forms, including, but not limited to, non-volatile media, volatile media, etc. The memory or memories 54 can be a component of the computing system 14, or the memory or memories can be operatively connected to the computing system 14 for use thereby. The term "operatively connected" as used throughout this description can include direct or indirect connections, including connections without direct physical contact. The memory 54 may contain data 60 and/or instructions 56 (e.g., program logic) executable by the processor(s) 58 to execute various functions described herein. The memory 54 may contain additional instructions as well, including instructions to transmit data to or receive data from data sources exterior of the vehicle via communications interfaces 16.

The computing system 14 may be operatively connected to the other vehicle systems and elements and otherwise configured so as to affect control and operation of the vehicle 11 and its components as described herein. In embodiments described herein, the computing system may be configured to automatically operate the various shade deployment mechanisms so as to deploy and retract the deployable shades, based on the criteria and inputs described herein.

The computing system 14 may be configured to control at least some systems and/or components autonomously (without user input) and/or semi-autonomously (with some degree of user input). For example, the computing system may control the shade deployment mechanisms described herein so as to automatically deploy and retract the shades. Alternatively, a manual control command to the shade deployment mechanisms may be routed through and/or implemented by the computing system 14. Manual control of the shade deployment mechanisms may also be prioritized so as to enable computing-system generated control commands to be overridden. The computing system 14 may also be configured to control and/or execute certain other functions autonomously and/or semi-autonomously.

In one or more arrangements, the computing system 14 described herein can incorporate artificial or computational intelligence elements, e.g., neural network or other machine learning algorithms. Further, in one or more arrangements, the hardware and/or software elements configured for performing particular functions or operations described herein may be distributed among a plurality of elements and/or locations.

Computing system 14 may operate in a networked environment supporting connections to one or more remote computers, such as other computing devices, terminals and/or mobile devices (e.g., mobile phones, short-range vehicle communication systems, vehicle telematics devices and vehicle-to-vehicle communications systems)(not shown).

Communications interfaces 16 may be configured to allow interaction between the vehicle computing system 14 and external sensors, other vehicles, other computing systems, various external messaging and communications systems (such as a satellite system or cellular phone/wireless communication system) and/or a user. The communications interfaces 16 may include a user interface (such as a voice/audio interface or a touch screen, for example) for providing information to or receiving input from a user of the vehicle 11. The communications interfaces 16 may also include interfaces enabling communication in a wide area network (WAN), a wireless telecommunications network, and/or other communications networks.

The vehicle 11 may be configured so that the computing system 14, sensor system 28, and other systems and elements thereof can communicate with each other using a controller area network (CAN) bus 33 or the like. Via the CAN bus and/or other wired or wireless mechanisms, the computing system 14 may transmit messages to (and/or receive messages from) the various vehicle systems and components. Alternatively, any of the elements and/or systems described herein may be directly connected to each other without the use of a bus. Also, connections between the elements and/or systems described herein may be through another physical medium (such as wired connections) or the connections may be wireless connections.

Figure 2:
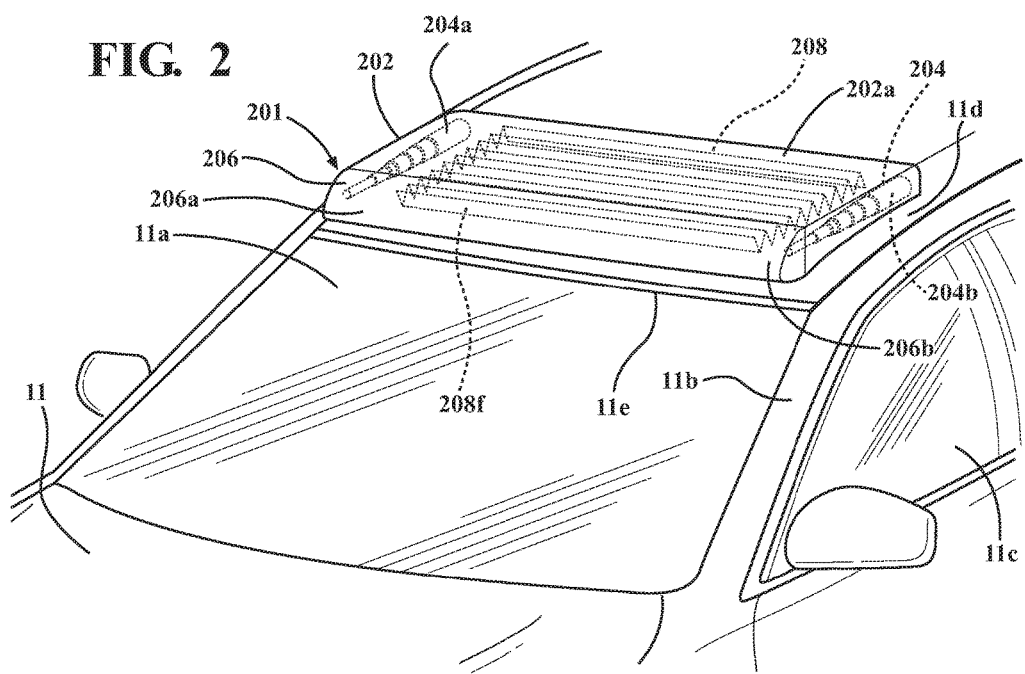
FIG. 2 is a schematic perspective view showing a shade system in accordance with an embodiment described herein, with the shade in a stowed or retracted condition.
Figure 3:
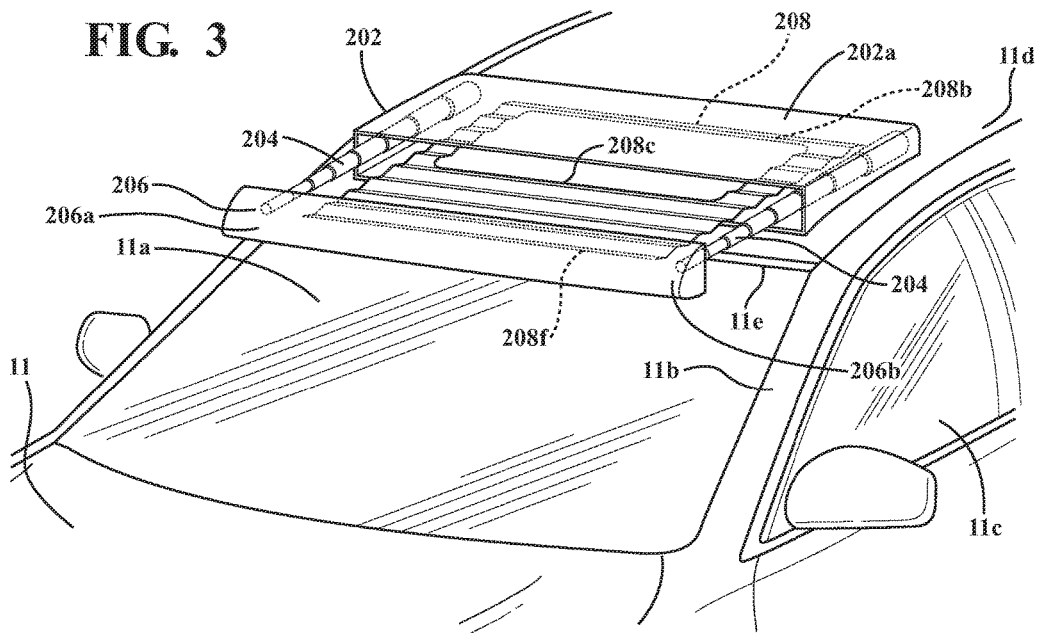
FIG. 3 is the schematic perspective view of FIG. 2 showing the shade in a deployed condition.

Embodiments of a vehicle 11 described herein may incorporate one or more shade systems actuatable to deploy and retract shades structured to block or attenuate light emanating from an extra-vehicular light source (such as the Sun) so as to shine through a vehicle window to a predetermined location in an interior of the vehicle. FIGS. 2-6B show various embodiments and arrangements of shade systems. FIGS. 2, 2A, 3, and 3A show an example of one embodiment of a deployable shade system, generally designated 201. FIG. 2 is a schematic perspective view showing the shade 208 in a stowed or retracted condition. FIG. 2A is a schematic side cross-sectional view of the shade system as shown in FIG. 2. FIG. 3 is the schematic perspective view of FIG. 2 showing the shade 208 in a deployed condition. FIG. 3A is a schematic side cross-sectional view of the shade system as shown in FIG. 3.

In the embodiment shown, shade system 201 includes a housing 202, at least one deployable shade 208 mounted in the housing, and a shade deployment mechanism (generally designated 204). Shade 208 is configured to be deployable in a direction toward a front of the vehicle. Housing 202 may be positioned on the vehicle roof at a location which facilitates deployment of the shade 208 from the housing so as to extend above at least a portion of an associated vehicle window. For example, FIGS. 2-3A show an embodiment where the shade 208 is deployable to extend above a portion of the vehicle front windshield. Housing 202 may serve to contain the shade 208 and at least a portion of the deployment mechanism 204. Depending on such factors as the structure and extent of coverage of the shade 208 deployable from the housing and the structure of the deployment mechanism 204, housing 202 may be structured to fit between a front edge 11e of the vehicle roof and any sunroof (not shown) incorporated into the roof 11d. To speed deployment and to conserve space, the housing 202 may be positioned as close as possible to an edge of the roof 11d residing over a window that a particular shade is designed to extend above.

The shade housing 202 may be fabricated with the vehicle roof 11d as an integral part of the roof, or the housing may be formed separately and attached to the roof. Housing 202 may have a body portion 202a and a front cover 206 which presses against a front opening of the housing to seal the housing 202 when the shade 208 is retracted. Cover 206 may be aerodynamically shaped so as to minimize drag and/or turbulence caused by air flow past the housing 202.

Each of the deployable shades described herein may be formed from an opaque or translucent material designed to block or attenuate light passing therethrough when the shade is in a deployed condition. Any shade embodiment described herein may also be completely opaque to incident light, or the shade may have any of a variety of opacities, depending on the requirements of a particular application. The opacity of a shade may be defined as the amount of light permitted to pass through the shade when it is in a deployed condition. A shade may be formed from any of various polymeric films, fabrics, and/or any other suitable material or materials.

Referring to the drawings, in embodiments described herein, each shade may be in the form of a visor extending outwardly from a housing mounted on the vehicle 11, so as to be interposable between a light source external to the vehicle and at least a portion of an associated vehicle window. A "light source external to the vehicle" and an "external light source" may be any light source exterior of the vehicle, for example a star such as the Sun, or another light source. The visor may be structured to project in a direction away from the vehicle when the visor is in a deployed condition, rather than extending along or parallel to the window, and rather than resting on the window itself.

In the embodiment shown in FIGS. 2-3A, the shade 208 has a foldable accordion-like structure which enables retraction to a relatively compact form for stowage, but which is easily deployable and unfoldable by a suitable deployment mechanism into a flat or nearly-flat sheet-like configuration. Shade 208 may include a cutout 208c positioned so as to facilitate airflow over the windshield 11a, through the shade 208, and over the top of the housing 202 when the shade is deployed as shown in FIGS. 3 and 3A. This feature may aid in reducing wind resistance and forces acting on the deployed shade. FIG. 3A shows an example of a possible airflow W1 over the vehicle hood, along the windshield 11a, through cutout 208c, and over housing 202 during motion of the vehicle with the shade 208 deployed. A forward-most end 208f of the shade 208 may be attached to housing cover 206 so that when the housing cover is extended from the housing 202 by the deployment mechanism 204, the shade end 208f is pulled forward and the shade 208 is expanded and deployed. A rear end 208b of the shade may be secured to a rear end of the housing interior (not shown).

The deployment mechanism 204 may be structured to both deploy the shade 208 and retract the shade, responsive to commands from computing system 14 and/or from a vehicle occupant. For these purposes, the deployment mechanism may be operatively connected to computing system 14 and to a manual shade system control 199 located, for example, on the vehicle control console.

In certain embodiments, the shade deployment mechanism 204 includes one or more cylinders (such as pneumatic or hydraulic cylinders) and associated controls and other mechanisms necessary for operation of the cylinders as described herein. Controls and mechanisms (for example, a flow-control valve system and a pressurized fluid source configured for computer and/or manual control) necessary or desirable for operation of the cylinders as described herein are well-known and will not be described in great detail. However, it will also be realized that other types of deployment systems may be used. For example, the shade embodiments described herein may be deployable and retractable using a rack-and-pinion gear system or another type of system.

In certain embodiments described herein, the deployment mechanism comprises at least one pneumatic or air cylinder operatively connected to the housing cover 206. In the embodiment shown in FIGS. 2 and 3, the deployment mechanism 204 comprises a pair of air cylinders 204a and 204b. Any cylinders used may be single-acting or double acting, depending on the requirements of a particular application. In one embodiment, air cylinders 204a and 204b are telescoping air cylinders. Telescoping cylinders suitable for the applications described herein may be commercially-available from any of a variety of sources, for example, Ergo-Help Pneumatics of Fox River Grove, Ill.

Figure 9:
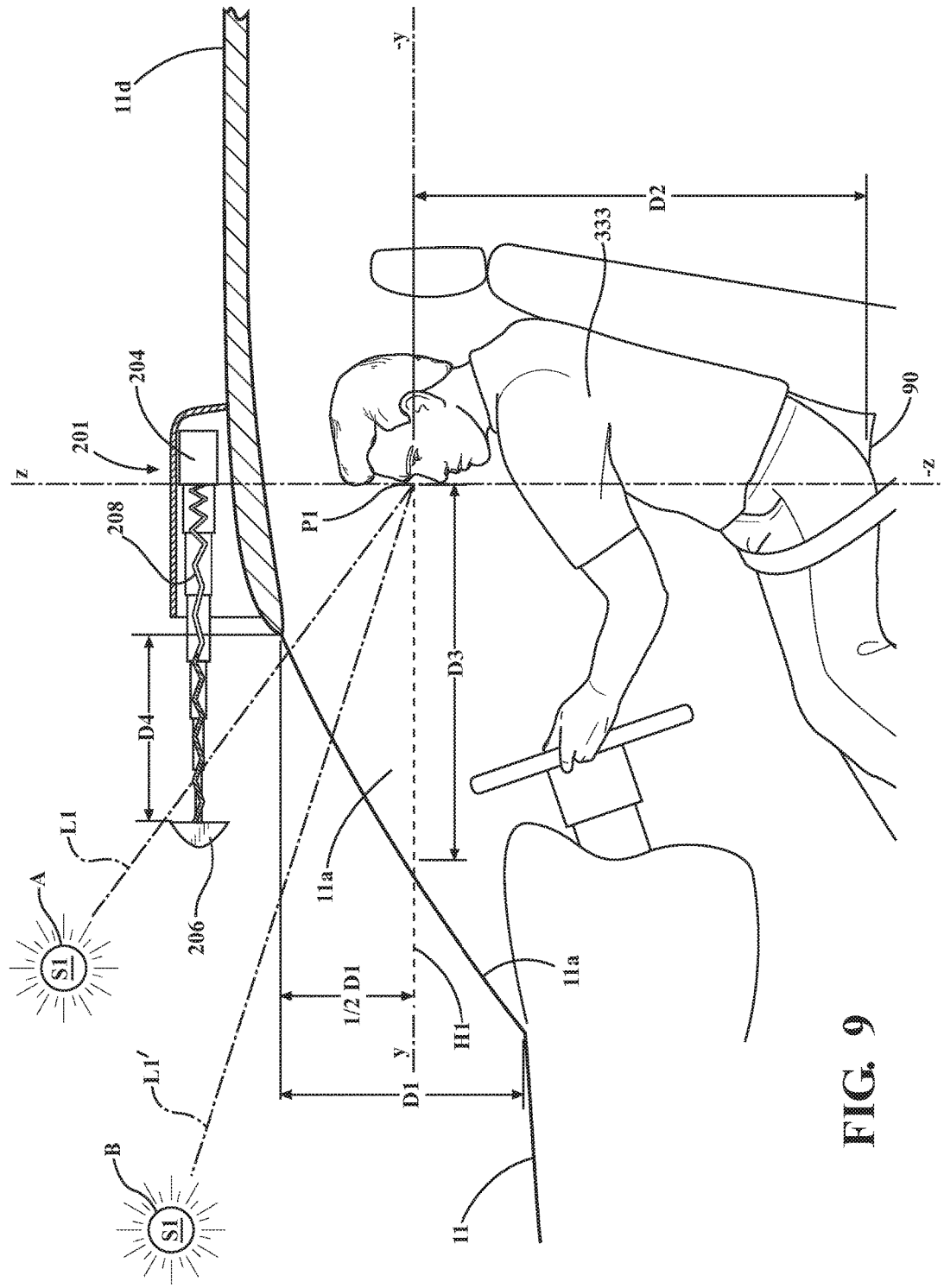
FIG. 9 is a schematic side view of a portion of a vehicle illustrating the effect of direct sunlight impinging on a driver may affect deployment and effectiveness of a vehicle shade.

In the embodiment shown in FIGS. 2-3A, a first cylinder 204a is attached to one end 206a of the housing cover 206, and a second cylinder 204b is attached to an opposite end 206b of the housing cover 206. When the deployment mechanism is actuated, the cylinders 204a and 204b expand toward the front of the vehicle, forcing the cover 206 away from the housing 202, thereby unfolding and deploying the shade 208. When it is desired to retract the shade 208, the deployment mechanism is operated to retract the cylinders 204a and 204b, thereby folding and stowing the shade 208. As seen in FIG. 9, in one embodiment, the shade 208 may be dimensioned and the deployment mechanism 204 configured so as to deploy the shade out to a distance D4 from a front edge of the vehicle roof 11d equal to approximately one half of a vertical height D1 of the vehicle windshield.

Figure 4:
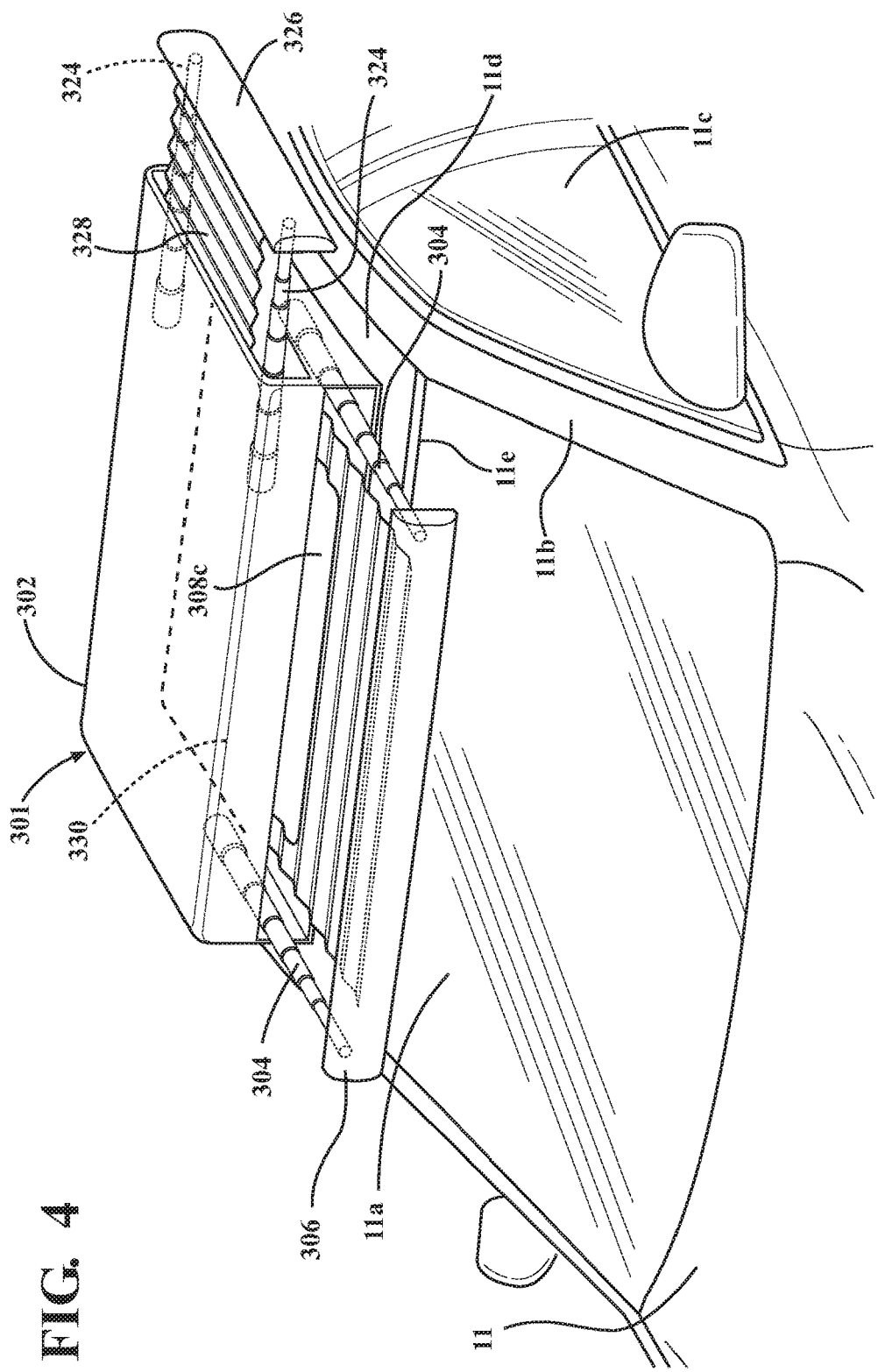
FIG. 4 is a schematic perspective view of another embodiment of a shade system.

FIG. 4 shows a schematic perspective view of another embodiment 301 of a shade system. This embodiment includes a housing 302 which is generally similar to housing 202 of FIGS. 2 and 3. Housing has a cover 306 and contains a forwardly-deployable shade 308 and an associated deployment mechanism 304, as previously described with respect to FIGS. 2 and 3. Shade system 301 also includes another shade 328 which is stowable in housing 302 and which is deployable by another deployment mechanism 324 (using air cylinders in the manner previously described) to extend above a driver's side window 11c of the vehicle. Shade 328 is deployable independently of shade 308. This deployment may aid in shielding the driver from direct sunlight in cases where the sunlight would otherwise reach the driver's eyes through the driver's side window. Although the side-deployable shade 328 is shown positioned above the forwardly-deployable shade 308 in housing 302, the side-deployable shade 328 could alternatively be positioned below the forwardly-deployable shade 308 in the housing.

Figure 5:
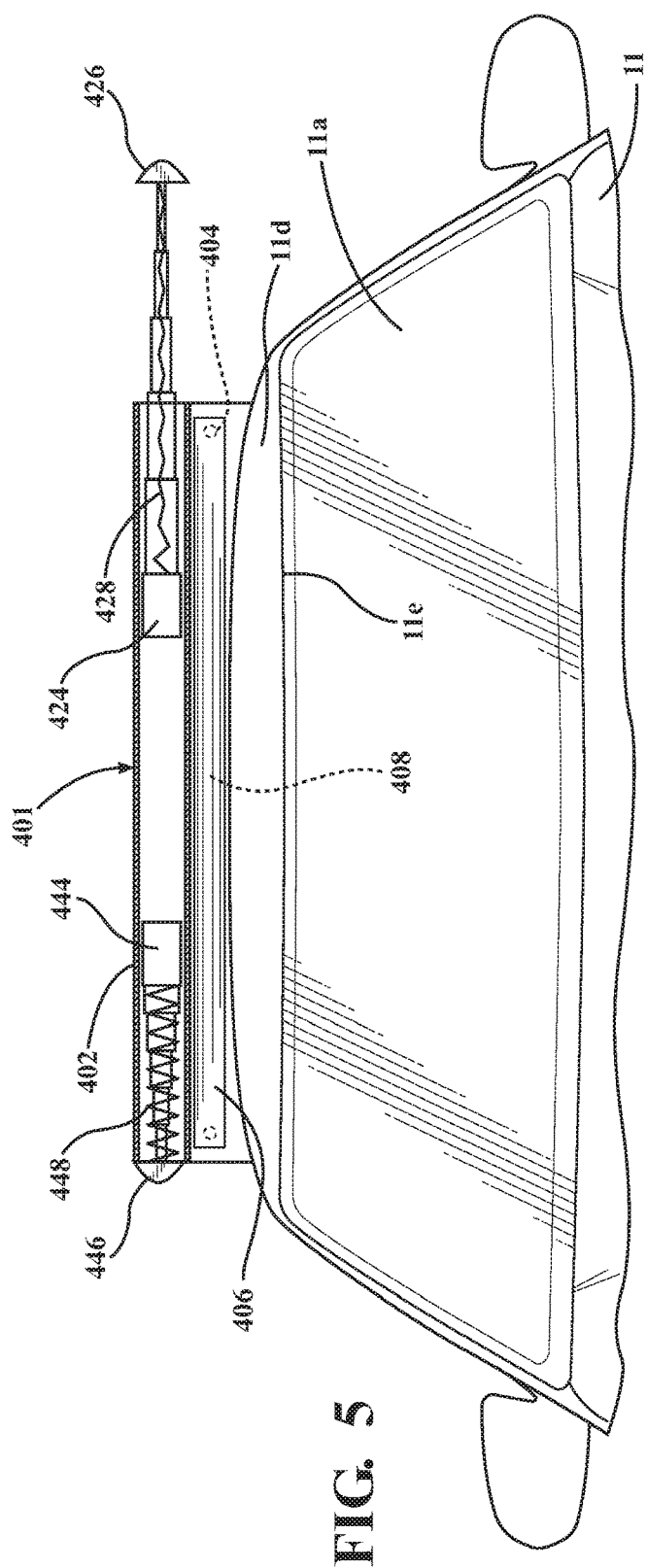
FIG. 5 is a schematic front view of yet another embodiment of a shade system.
Figure 6:
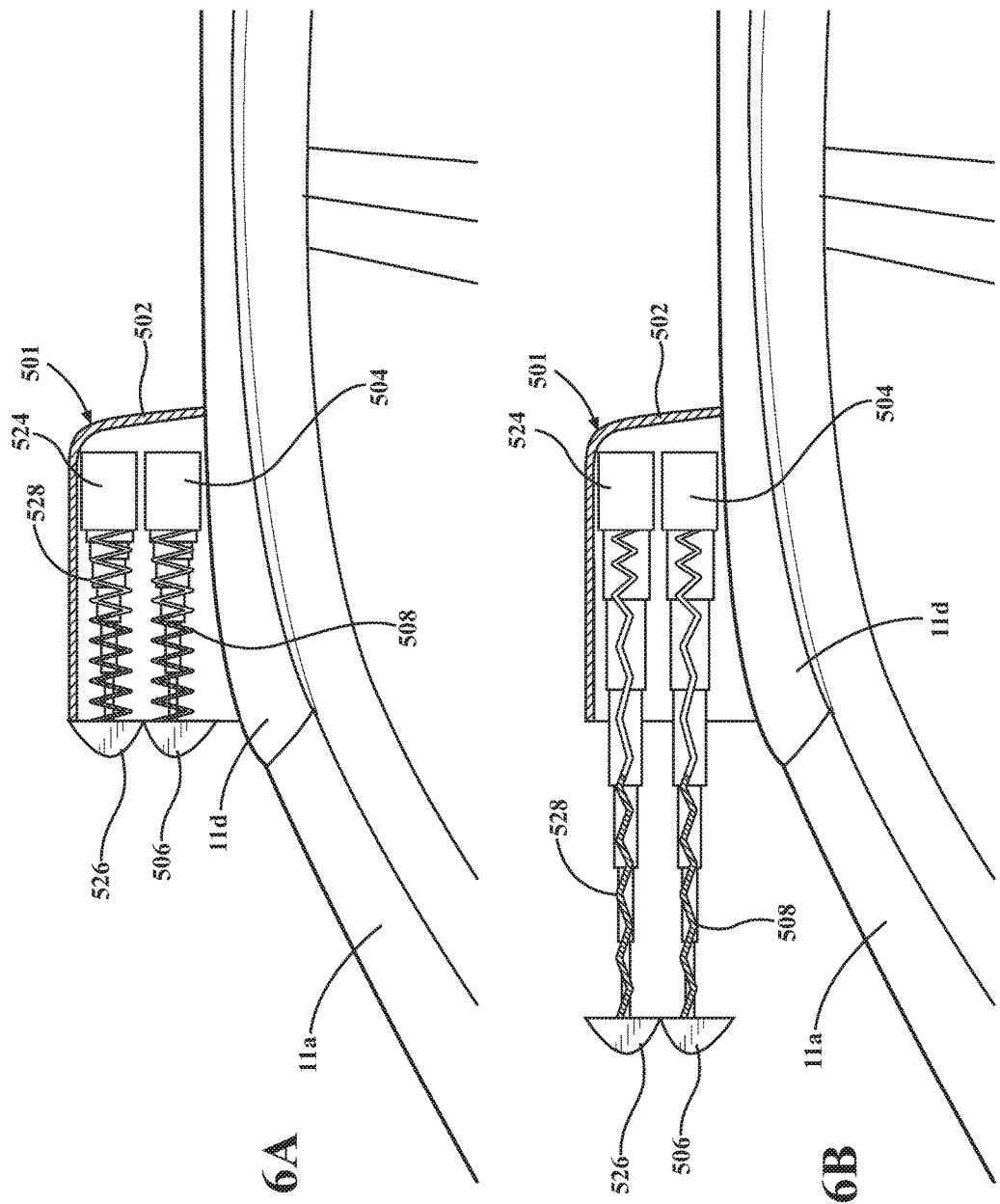
FIG. 6A is a schematic side cross-sectional view of yet another embodiment of a shade system, showing the shades in a stowed or retracted condition.
FIG. 6B is the schematic side cross-sectional view of FIG. 6A showing the shades in their deployed conditions.

FIG. 5 shows a schematic front view of yet another embodiment 401 of a shade system. System 401 includes a housing 402 similar to housing 202 and 302 previously described. System 401 also includes a side-deployable shade 428 similar to shade 328 of FIG. 4 using a deployment mechanism 424, and a forwardly-deployable shade 408 similar to previously described shades 208 and 308 and deployable using a deployment mechanism 404. This embodiment also includes another side-deployable shade 448 which is deployable independently from shades 408 and 428, using another deployment mechanism 444. Shade 448 may extend above a front seat passenger's side window when deployed.

FIGS. 6A and 6B show schematic cross-sectional side views of yet another embodiment 501 of a shade system. This embodiment includes a housing 502 similar to housing 202 previously described. The housing contains a pair of shades 508 and 528 which are independently forwardly-deployable as previously described. Shades 508 and 528 are in a stacked arrangement, with shade 528 positioned above shade 508. Each of shades 508 and 528 is deployable as previously described using an associated independently actuatable deployment mechanism (mechanism 504 for shade 508 and mechanism 524 for shade 528). The arrangement shown in FIGS. 6A and 6B is designed to enable the effective opacity of the shade system 501 to be varied. The opacity of a given shade may be controlled using any of a variety of known methods, for example, by selecting translucent shade materials having different opacities and/or controlling the structure of the shade. In another example, a shade may have a series of small through-openings such as pinholes formed therein and distributed along the entire area of the shade. These openings may be designed to permit a certain amount of light to pass through the shade, dependent on the sizes of the openings. If both of shades 508 and 528 have this structure, the average sizes of the openings in one of shades 508 and 528 may be larger than the average sizes of the openings in the other one of shades 508 and 528. Thus, in this case, the shades 508 and 528 may have different effective opacities.

For purposes of controlling the opacity of the shade system 501, shade 508 may have a first opacity and shade 528 may have a second opacity different from the first opacity. In one deployment mode, to effect a relatively smaller reduction in the level of light entering the vehicle, a vehicle occupant may deploy only a first shade having a relatively lower opacity (for example, shade 508). Alternatively, to effect a relatively greater reduction in the level of light entering the vehicle, a vehicle occupant may deploy only a second shade having a relatively higher opacity (for example, shade 528). Alternatively, to effect the greatest reduction of light which may be provided by the shade system, the occupant may deploy both of shades 508 and 528 at the same time, thereby maximizing the opacity of the deployed shade system 501.

If the vehicle has a shade system with the structure shown in FIGS. 6A and 6B, deployment of the one of the upper of lower shades (528 and 508, respectively) may be automatically controlled using the automatic control criteria set forth below, while the remaining one of shades 508 and 528 may be controlled manually. In a particular embodiment, the lower shade 508 is controlled automatically, while the upper shade 528 is controlled manually. Alternatively, both of shades 508 and 528 may be controlled manually, or automatic control may be overridden by issuing a manual control command.

In another embodiment (not shown), a shade system may include one or more shades configured for deployment in a direction toward a rear of the vehicle 11, so as to extend above a portion of the vehicle rear window. In addition, the shade system may include one or more shades configured for deployment so as to extend over rear seat passenger side windows. These capabilities may be provided by a shade system as shown in FIG. 5, for example, positioned above the vehicle rear window in the same manner as shade system 401 is positioned above the front windshield. Then, shades similar to shades 428 and 448 of FIG. 5 may deploy to extend over the rear seat passenger windows.

Referring now to FIGS. 7-11B, in one possible mode of deployment for the vehicle shades, the locations of the external light source and pertinent portions of the vehicle (such as the windows and the deployed shades) with respect to common reference location(s) and/or axes may be determined, and these locations may be continuously updated as the vehicle moves. This information may be used to determine if a deployable shade mounted on the vehicle would be interposed between the driver and light source if the shade were deployed.

Figure 9A:
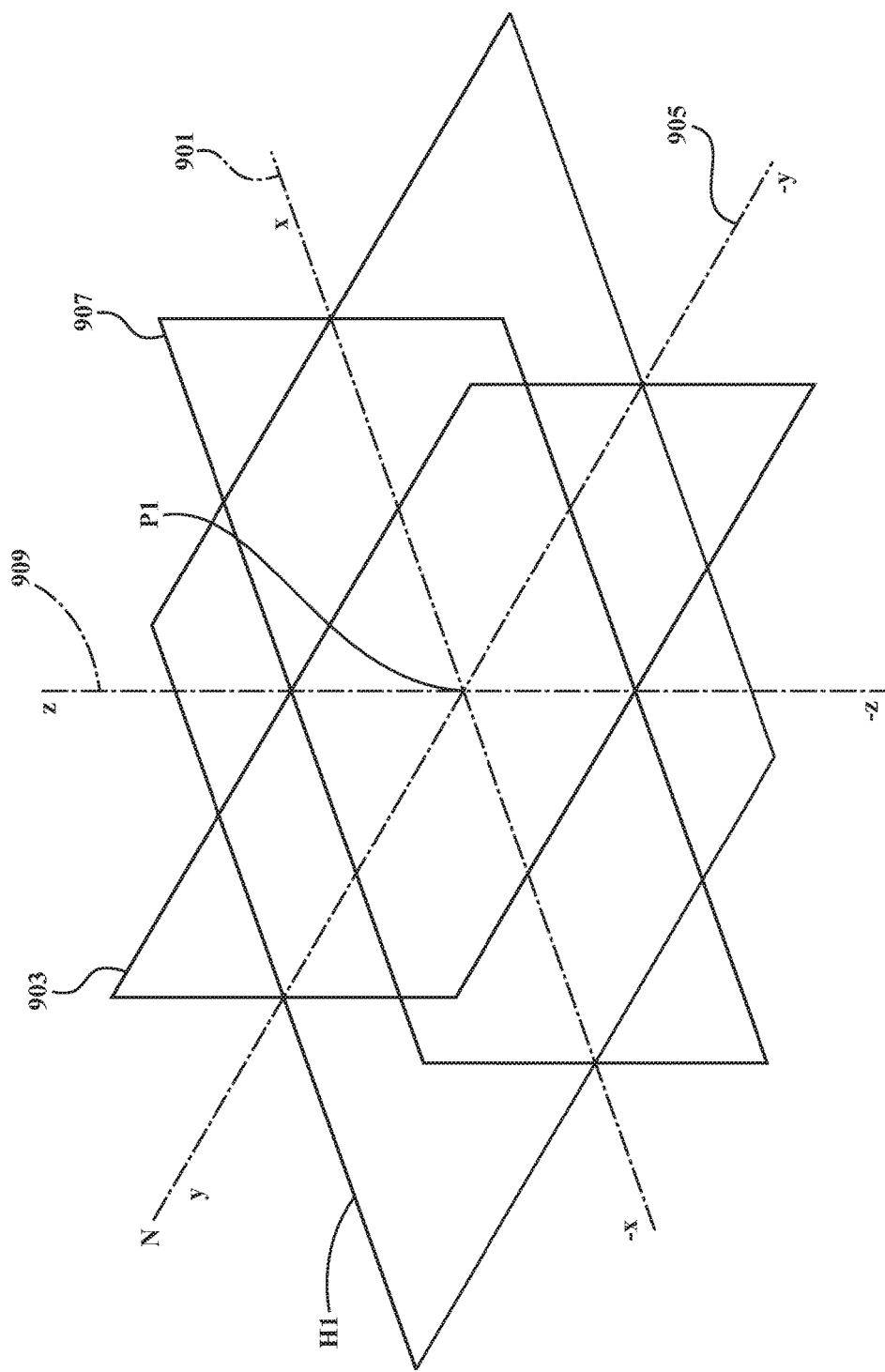
FIG. 9A shows one example of a spatial coordinate system usable for establishing references locations for relative changes in the positions of vehicle features (for example, points on the vehicle windshield) during driving.

Referring to FIGS. 9 and 9A, in one embodiment and for the purposes described herein, a spatial coordinate system may be established with P1 as a point in space serving as a reference location or origin. The reference location P1 may be defined or assigned using any desired criteria. In one embodiment, the location P1 is a point designed to represent eye level on the face of a driver seated in an upright (i.e., driving) position in the driver's seat. Referring to FIG. 9, for purposes of fixing point P1 in the embodiment shown, the predetermined location P1 within the vehicle may be a point defined by an intersection of a vertical plane bisecting a driver's seat of the vehicle (as shown by plane 903 of FIG. 9A), a horizontal plane H1 located at a predetermined vertical distance D2 above a seating surface 90 of the driver's seat so as to simulate the driver's eye level (also as shown in FIG. 9A), and a predetermined horizontal distance D3 from a front windshield of the vehicle and along plane H1. Alternatively, the location P1 may be determined using any other desired method.

Referring to FIGS. 9 and 9A, an x-axis 901 of the spatial coordinate system may lie along horizontal plane H1 and may pass through P1. X-coordinates to the right of a vertical plane 903 passing through location P1 (from the perspective of a driver facing toward the front of the vehicle) and extending parallel to a fore-aft axis of the vehicle may be positive x-coordinates, while x-coordinates to the left of the vertical plane 903 may be negative x-coordinates. The y-axis 905 may lie along plane H1 and may pass through P1 perpendicular to the x-axis 901. The true north direction N may be established as the reference for the positive y-direction. Thus, y-coordinates lying forward of a vertical plane 907 passing through location P1 (from the perspective of a driver facing toward the front of the vehicle) and extending perpendicular to a fore-aft axis of the vehicle may be positive y-coordinates, while y-coordinates lying behind the vertical plane 907 may be negative y-coordinates. The z-axis 909 may pass through P1 perpendicular to both the x-axis 901 and the y-axis 905. Z-coordinates lying above the horizontal plane H1 (from the perspective of a driver facing toward the front of the vehicle) may be positive z-coordinates, while z-coordinates lying below the horizontal plane H1 may be negative z-coordinates. The location P1 may serve as the origin of a coordinate system which moves with the vehicle, and within which pertinent portions of the vehicle move during turning, tilting, and other motion of the vehicle.

A vehicle pose may be estimated using any of a variety of known methods. As is known in the pertinent art, the vehicle pose may describe the vehicle's 3D coordinates and orientation (for example, in terms of x, y, and z coordinates with respect to a reference location, and also in terms of pitch, yaw, and roll angles relative to reference axes extending through the reference location). Vehicle pose may be estimated using a vehicle pose estimation module 88 incorporated into (or in operative communication with) computing system 14. Module 88 may include all hardware and software elements needed to estimate the vehicle pose, using information received from sensor system 28 and any other pertinent source. For example, the vehicle pose may be estimated using data from various sensors such as a GPS or navigation system (for example, navigation unit 28a), 3D LIDAR unit 28d, one or more cameras 28e, and an IMU (inertial measurement unit) 28b.

In some embodiments, for reference purposes, a reference orientation of the vehicle may be established using the location P1 as a reference and with respect to the x, y, and z-axes shown in FIG. 9A, with the vehicle positioned on a level road surface and facing true north. A pose of the vehicle in the reference orientation may be a condition where the vehicle pitch with respect to the x-axis is zero, the vehicle roll with respect to the y-axis is zero, and the vehicle yaw with respect to the z-axis is zero. Alternatively, the vehicle pose may be estimated or measured using other points and/or axes for reference purposes.

The vehicle computing system 14 may be configured to store the spatial coordinates of pertinent portions of the vehicle 11 relative to location P1 when the vehicle is in the reference orientation described above. For example, points or locations along an exterior surface of at least one vehicle window (such as vehicle front windshield 11a or any other vehicle window, such as driver's side window 11c of FIG. 4) may be assigned reference spatial coordinates with respect to the reference location P1 when the vehicle is in the reference orientation, and may be stored in a memory such as memory 54 of computing system 14. As used herein with respect to the vehicle windows or the shades/visors described herein, the term "point" may refer to a discrete, finite area or a portion of the window under discussion. For example, points along the front windshield 11a spaced apart a predetermined distance from each other may be assigned coordinates with respect to location P1. In one example, the windshield 11a may be divided into a set of points spaced apart a distance of 1 millimeter (or any other desired spacing) from each other, and a distinct coordinate assigned to each point. These coordinates taken when the vehicle is in the previously-described reference orientation may serve as reference coordinates for the points along the windshield. Also, this principle may be applied to the other vehicle windows. That is, the spatial coordinates of the points along each vehicle window when the vehicle is in the reference orientation may be stored in a memory, such as memory 54 of computing system 14. These coordinates may serve as reference coordinates for the points along the vehicle windows. This principle may also be applied to the various deployable shades described herein. That is, the points in space representing the shades in their deployed conditions may be assigned coordinates with respect to the location P1 when the vehicle is in the reference orientation, and the coordinates stored in memory as reference coordinates for the points in space representing each shade when the shade is in a deployed condition.

Figure 7:
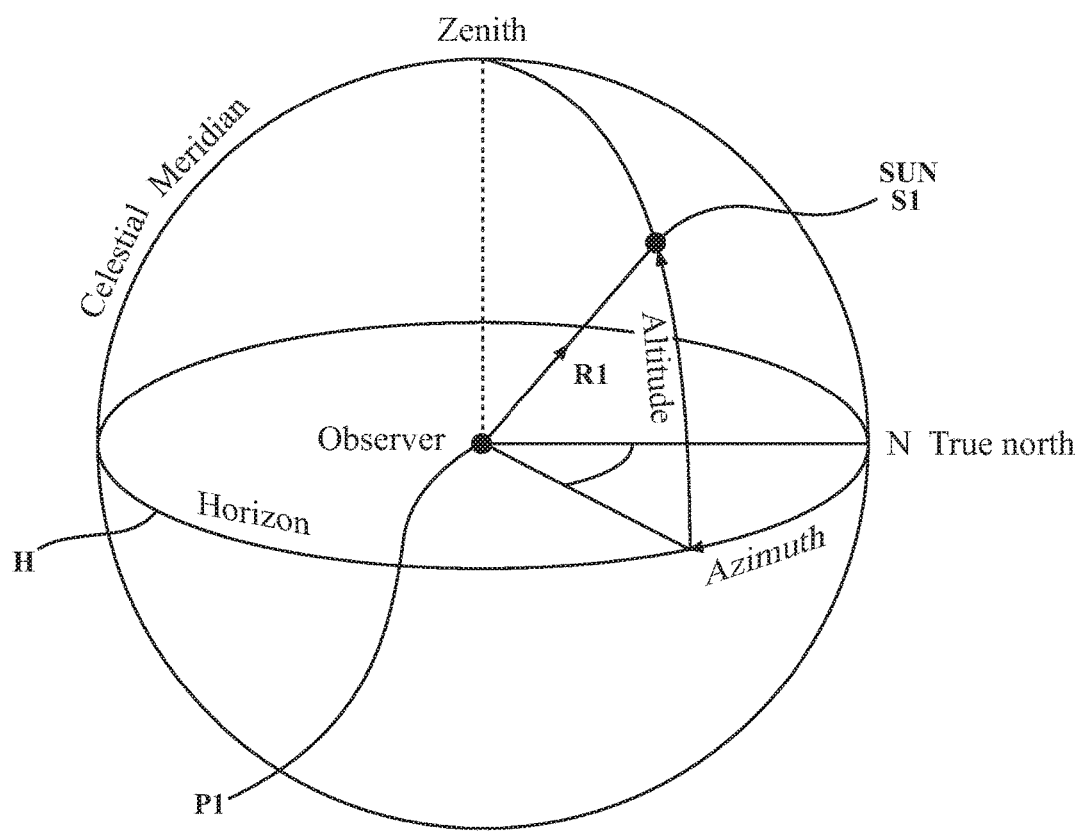
FIG. 7 shows one known method of designating the altitude and azimuth of the Sun with in terms of a horizontal coordinate system that uses the observer's local horizon as the fundamental plane.

Although the following description will assume the external light source to be the Sun S1 in the sky during daytime, one or more adaptations of the methods described herein may be applied to determine the position of any light source exterior to the vehicle with respect to the location P1. The position and/or direction of the Sun in the sky relative to a predetermined location P1 within the vehicle may be determined using an adaptation of any of a number of known methods. Methods for calculating the azimuth and altitude of the Sun relative to a known observer location are well-known and may be adapted using known techniques to enable determination of the position of the Sun in the sky relative to the predetermined location P1 within the vehicle. For example, FIG. 7 shows one known method of designating the altitude and azimuth of the Sun with in terms of a horizontal coordinate system that uses the observer's local horizon as the fundamental plane. In this method, the estimated coordinates of the Sun may be specified in terms of an azimuth projected on a horizontal reference plane H extending to a horizon visible from an observer location and measured with respect to a true north direction N, and also in terms of an altitude measured with respect to the horizon of the vehicle. The altitude and azimuth values may be estimated for the center of an apparent disk or circle defined by an outer edge of the Sun in the sky.

A navigation system (such as a GPS or other on-vehicle navigation system 28a) may be configured to estimate the position of the Sun S1 relative to an observer location (for example, location P1 in the vehicle). Alternatively, computing system 14 may reference look-up tables or use formulas or algorithms stored in memory 54 to estimate the azimuth and altitude of the Sun relative to a given location on the earth's surface, given the pertinent date and time information, the observer location as determined by a navigation system, and other pertinent information. If needed, the computing system 14 may be configured to convert an estimated location of the Sun S1 expressed in the horizontal coordinate system described above into coordinates of the spatial coordinate system shown in FIG. 9A, thereby providing an estimate of the Sun's position and/or direction relative to location P1. For example, the predetermined location P1 within the vehicle shown in FIG. 9 may reside at a predetermined distance above the road surface and at a known location with the vehicle. If the predetermined location P1 is to be taken as the observer location, since the location P1 may differ from a conventional observer location used as a reference, the computing system 14 or a navigation system used for estimating the relative position of the Sun may be configured to adjust the Sun position estimate to compensate for any altitude difference (or other difference) between the location P1 and any conventional observer location normally used for purposes of estimating the position of the Sun, so that an estimated altitude and direction of the Sun with respect to the location P1 may be provided.

In another aspect, a direction of the Sun in the sky (or of any other external light source) with respect to a predetermined location P1 within the vehicle may be determined using one or more appropriately configured vehicle sensors, such as suitably configured cameras or other external light source detection sensors (not shown). The computing system 14 may be configured to convert the sensor data into a set of coordinates relative to location P1 to construct a virtual straight line connecting the location P1 with the light source (or extending from the location P1 in the direction of the light source) and to facilitate other shade deployment calculations by the computing system 14 as described herein.

Using the estimated location of the Sun S1 in the sky, a virtual straight line L1 connecting the location P1 with the estimated location of the Sun S1 may be constructed by the computing system 14. Alternatively, a virtual straight line L1 extending from P1 in a direction toward the estimated location of the Sun S1, out to a location exterior of the vehicle and at a predetermined distance from the vehicle, may be constructed by the computing system 14. The purpose of the virtual line L1 is to indicate the direction of the Sun S1 (or other external light source) with respect to location P1. As applied to the line L1 described herein, the term "virtual" may refer to a line that is temporarily simulated or extended by a computing system, for example computing system 14. The points along the virtual line may have spatial coordinates in the coordinate system of FIG. 9A. The virtual line L1 may alternatively be determined using methods other than those described in detail herein.

The computing system 14 may also be configured to continuously or regularly update the spatial coordinates forming the virtual line L1 responsive to changes in the Sun altitude and azimuth information as the vehicle moves along the surface of the earth and as the relative position of the Sun S1 changes over time, based on continuous or regular updating of the position of the Sun S1 relative to the location P1.

The computing system may be configured to determine if the virtual straight line L1 connecting the predetermined location P1 with the Sun S1 (or other external light source) passes through a window of the vehicle. For purposes of determining if the virtual line L1 connecting the position of the Sun S1 with the predetermined location P1 passes through the windshield 11a or other vehicle window, the computing system 14 may continuously or at least regularly compare the coordinates representing points on the window with the coordinates making up the current version of line L1 during movement of the vehicle 11. If any of the coordinates representing points on the window are the same (within a predetermined spatial tolerance zone) as any of the coordinates making up the line L1, it may be assumed that light from the Sun S1 intersects and is passing through the window and reaching the location P1 (i.e., that direct light from the Sun S1 is reaching the driver 333). In contrast, if none of the coordinates representing points on a window are the same (within a predetermined spatial tolerance zone) as any of the coordinates making up the line L1, it may be assumed that the line L1 is not intersecting the window, and that light from the Sun S1 is not passing through the window. If it is determined that the line L1 does not intersect any vehicle windows, it may be assumed that direct light from the Sun S1 is not reaching the driver 333 through any window.

The altitude and azimuth of the Sun S1 with respect to the observer may vary with time and may depend on such factors as the geographical location of the observer on the surface of the earth (as may be expressed in terms of latitude and longitude, for example), the exact date or time of the year, and the time of day. In addition, as the vehicle moves, the predetermined location P1 moves with it. Because the altitude and azimuth of the Sun may vary and because the vehicle is moving, calculation or determination of the location of the Sun S1 with respect to the predetermined location P1 within the vehicle may be performed continuously or at regular intervals, to update the location of the sun S1 relative to location P1. This facilitates generation and updating of a virtual line L1 extending from the predetermined location P1 in a direction R1 toward the relative position of the Sun S1, as described herein.

As the vehicle moves and turns, the windshield 11a and other windows may move within the coordinate system of FIG. 9A and relative to the virtual line L1 extending from the location P1 in the direction of the Sun S1 in the sky. Thus, as the vehicle direction and pose change, the vehicle windows move within the spatial coordinate system and with respect to the line L1, and the coordinates of the points along the windows change with respect to the line L1. In certain orientations of the vehicle and positions of the Sun S1, as shown in FIG. 9, the virtual line L1 may not pass through the windshield or any other vehicle window. In these cases, it may be assumed that direct light from the Sun (or other light source) is not passing through the windshield or any other vehicle window to the location P1. Alternatively, in other orientations of the vehicle and as shown in FIG. 9, the virtual line L1 (such as line L1') may pass through the front windshield or another window of the vehicle V1. In these cases, it may be assumed that light from the Sun (or other light source) is passing through the windshield or another vehicle window and reaching the location P1.

Figure 8B:
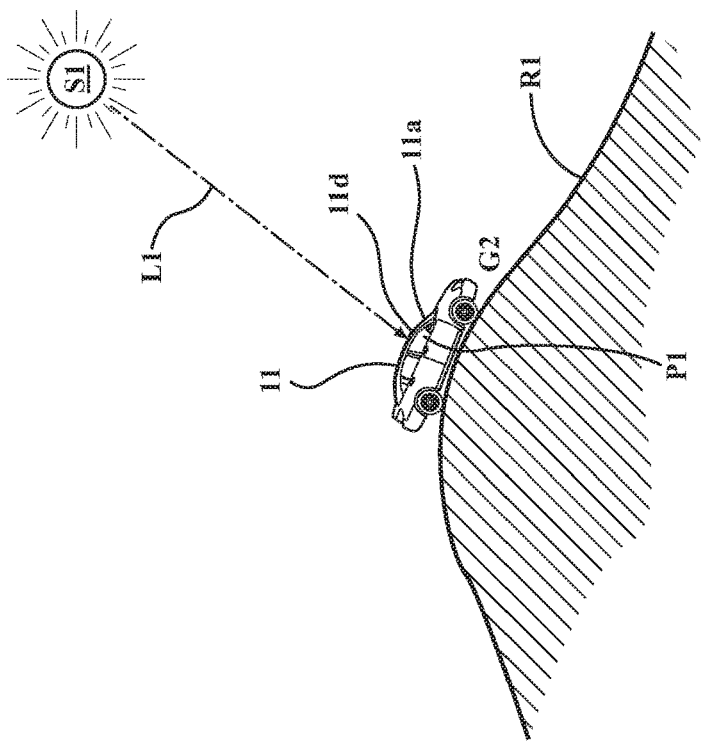
FIGS. 8A and 8B are schematic views illustrating how a change in vehicle pose may affect a direct flow of sunlight to a predetermined location inside a vehicle.
Figure 8A:
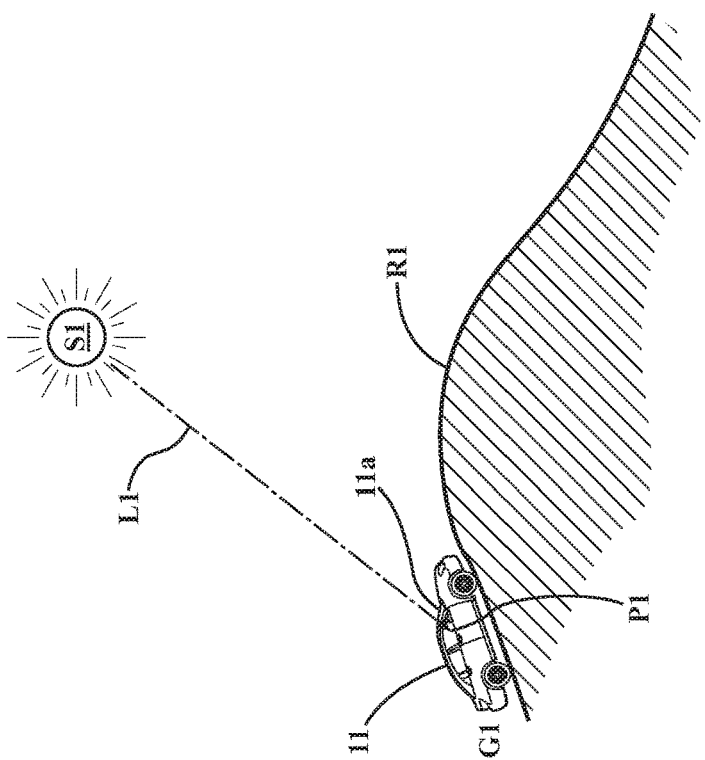

The vehicle pose and relative position of the Sun at any given moment will determine whether direct light from the Sun is reaching the location P1 inside the vehicle. FIGS. 8A and 8B illustrate how a change in vehicle pose may affect a direct flow of sunlight to location P1 inside the vehicle 11. In FIG. 8A, due to the vehicle pose at location G1, sunlight may shine directly into the vehicle through the front windshield 11a and reach location P1. In FIG. 8B, when the vehicle 11 is at a location G2 slightly farther along the road R1, the vehicle pose has changed so that the vehicle roof 11d is interposed between the Sun S1 and the location P1 (i.e., the roof, rather than the windshield 11a resides along the line L1 between the position of the Sun and location P1). Thus, the change in pitch of the vehicle 11 between locations G1 and G2 now prevents direct sunlight from entering the vehicle 11.

Figure 11A:
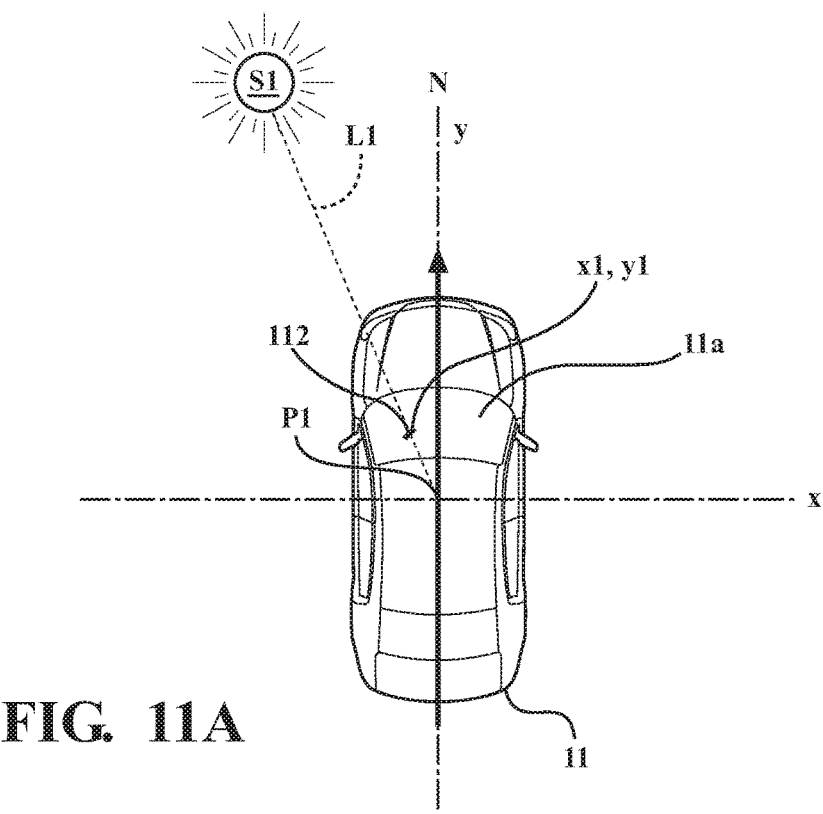
FIG. 11A is a schematic view of a vehicle in an x-y reference plane traveling in a reference direction, and illustrating a set of reference coordinates of a point located on the vehicle windshield.
Figure 11B:
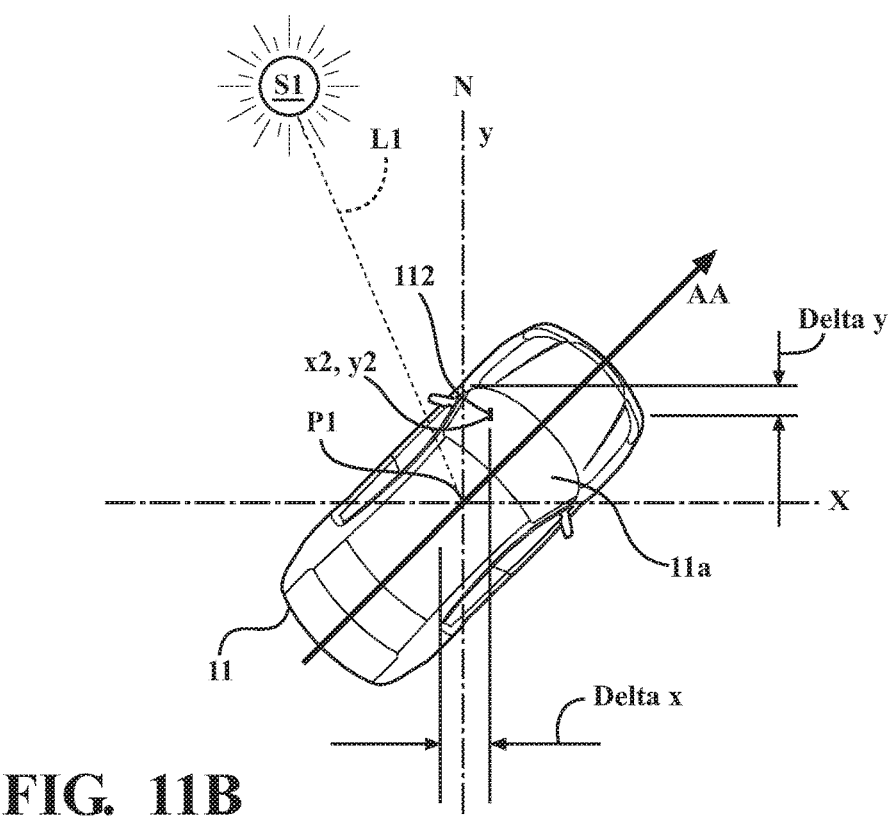
FIG. 11B is a schematic view of the vehicle of FIG. 11A in the x-y reference plane after turning in a direction different from the reference direction, illustrating a change in the coordinates of the point located on the vehicle windshield.

In another example, FIGS. 11A and 11B illustrate a change in the coordinates of a location 112 on windshield 11a of a vehicle 11 when the vehicle turns. FIG. 11A is a schematic view of the vehicle 11 in an x-y reference plane traveling in the reference direction N (true north). In this orientation of the vehicle 11, the reference coordinates of the location 112 on the windshield 11a are x1, y1, z1 (that is, the coordinates of the windshield location when the vehicle is in the reference orientation are x1, y1, z1).

FIG. 11B is a schematic view of the vehicle 11 in the x-y reference plane after turning in a direction AA different from the reference direction N. In this orientation of the vehicle 11, the coordinates of the location 112 on the windshield 11a are x2, y2, z1. The computing system may determine the coordinates x2 and y2 by calculation given the reference coordinates x1, y1 and the angle of travel direction AA with respect to true north N. This angle may be determined by the navigation system 28a (or by the computing system 14 using information obtained from the navigation system). The change in the x-coordinate value is represented by delta-x, while the change in the y-coordinate value is represented by delta-y. In addition, it may be seen that the line L1 connecting the sun S1 with the location P1 intersects and passes through the windshield 11a when the vehicle 11 is traveling in the true north direction N as shown in FIG. 11A. This intersection would be detected by a comparison of the windshield coordinates with the coordinates making up the line L1 (i.e., one or more coordinates on the line L1 would coincide (within spatial tolerance limits) with one or more coordinates of points along the windshield 11a, as previously described). However, after the vehicle 11 turns in the direction AA as shown in FIG. 11B, the line L1 no longer intersects or passes through the windshield 11a. Thus, the change in vehicle direction now prevents direct sunlight from entering the vehicle through the windshield and reaching location P1. This condition would be detected by a comparison of the windshield coordinates with the coordinates making up the line L1. Since no coordinates on the line L1 would intersect the windshield 11a, it may be assumed that no direct sunlight passes through the windshield 11a to location P1. The above examples in FIGS. 8A-8B, 9, and 11A-11B illustrate some of the possible effects of changes in vehicle direction and pose (including yaw, roll, and pitch) on direct sunlight impinging on the driver.

The computing system 14 may be configured to use changes in the measured vehicle pose parameters to re-calculate the coordinates of pertinent portions of the vehicle (for example, points along the vehicle windshield) during motion of the vehicle. For these purposes, the computing system 14 may also use known dimensional relationships between the pose measurement reference points and axes and the spatial coordinate axes x, y, and z and location P1 of FIG. 9A. Stated another way, because the distances between reference location P1 and the reference location of each point making up the windshield, deployed shades, and other pertinent features are known and fixed, because these coordinates are known for the vehicle in its reference orientation, and because the relative locations of points in space of the portions of the various vehicle features are fixed with respect to each other, the computing system 14 may be configured to update the coordinates of each point making up the windshield and other vehicle pertinent features as the vehicle changes direction and pose, using sensor information relating to vehicle direction and pose.

By using the information and methods described above to continuously or regularly recalculate or redetermine the position of the Sun S1 relative to location P1 and the spatial coordinates of the locations along the vehicle windows, the computing system 14 may continuously or regularly monitor for intersections between the line L1 and the vehicle windows. If the virtual line L1 extending from the location P1 in the direction of the Sun (which is effectively a line connecting the location P1 with the position of the Sun in the sky) passes through a vehicle window, the computing system may determine that the driver is receiving direct light from the Sun through the windshield. Under these conditions, it may be desirable to determine if deploying one of the vehicle shades will block or attenuate the light reaching the driver 333, or if deploying one of the shades might possibly mitigate glare due to light scattering on the windshield (for example, due to dirt on the windshield).

The computing system 14 may also be configured to, if it is determined that the straight line passes through a window of the vehicle, determine if the line will pass through any deployable shade mounted on the vehicle when the shade is in a deployed condition. Thus, for example, if the line L1 passes through a windshield or other window, the computing system may compare the coordinates of the points along the deployed shades with the coordinates making up the line L1 connecting the position of the Sun S1 with the vehicle interior location P1. If any of these sets of coordinates match (within a predetermined spatial tolerance zone), it may be assumed that the line L1 connecting the location P1 with the position of the Sun S1 will pass through one of the shades if it were deployed, and that light from the light source S1 traveling along the line L1 may be blocked or attenuated by deployment of the shade. Thus, under these conditions, the deployed shade may shield the driver from light from the light source.

FIG. 9 is an illustration of how the relative position of the Sun S1 and/or the vehicle pose with respect to location P1 may affect whether direct sunlight reaches location P1, and whether a shade covering a portion of a window is to be deployed. As the altitude and/or azimuth of the Sun S1 in the sky changes over time, the orientation of the line L1 moves accordingly, from L1 to a L1'. For example, as seen in FIG. 9, when the Sun is at a location "A" higher in the sky, the computing system 14 may determine that line L1 will intersect or pass through a shade 208 covering a portion of the windshield 11a if the shade is deployed. In this case, the computing system may operate an associated shade deployment mechanism so as to deploy the shade. However, when the Sun is at a location "B" relatively lower in the sky, the computing system may determine that line L1' will not intersect or pass through the shade 208 if the shade is deployed. In this case, the computing system may forego deployment of the shade 208.

The computing system 14 may be continuously engaged in repeating, consecutive cycles of determining and/or updating the various coordinates, angles, relative positions and directions needed to make the determinations of whether the line L1 intersects a window of the vehicle, so that a suitable shade may be deployed as soon as it would be effective to attenuate light from the external light source, or retracted as soon as it would no longer be effective. System embodiments described above enable the deployment of any shade which would block or attenuate direct light entering through any window, where the direct light would reach the location P1 through the window. Thus, a shade may be deployed if it would block or attenuate direct light that would otherwise reach location P1, even if the shade being deployed is not positioned to extend above the window through which the direct light would enter the vehicle.

The computing system 14 may also be configured to, if it is determined that the straight line will pass through any deployable vehicle shade when the shade is deployed, determine if a vehicle shade through which the straight line will pass is already deployed. If a shade through which the straight line will pass is already deployed, the shade may be left in the deployed condition. The deployment state (i.e., deployed or retracted) of the shade may be detected and conveyed to the computing system 14 at any time by suitable sensors (not shown) operatively connected to the shade deployment mechanism, for example.

The computing system 14 may also be configured to, if a vehicle shade through which the straight line will pass is not already deployed, operate the vehicle so as to automatically deploy a shade through which the straight line will pass when the shade is deployed. This may be done by sending a command to a shade system (for example, one of shade systems 201, 301, 401, and 501 described herein) to actuate the appropriate shade.

Figure 10:
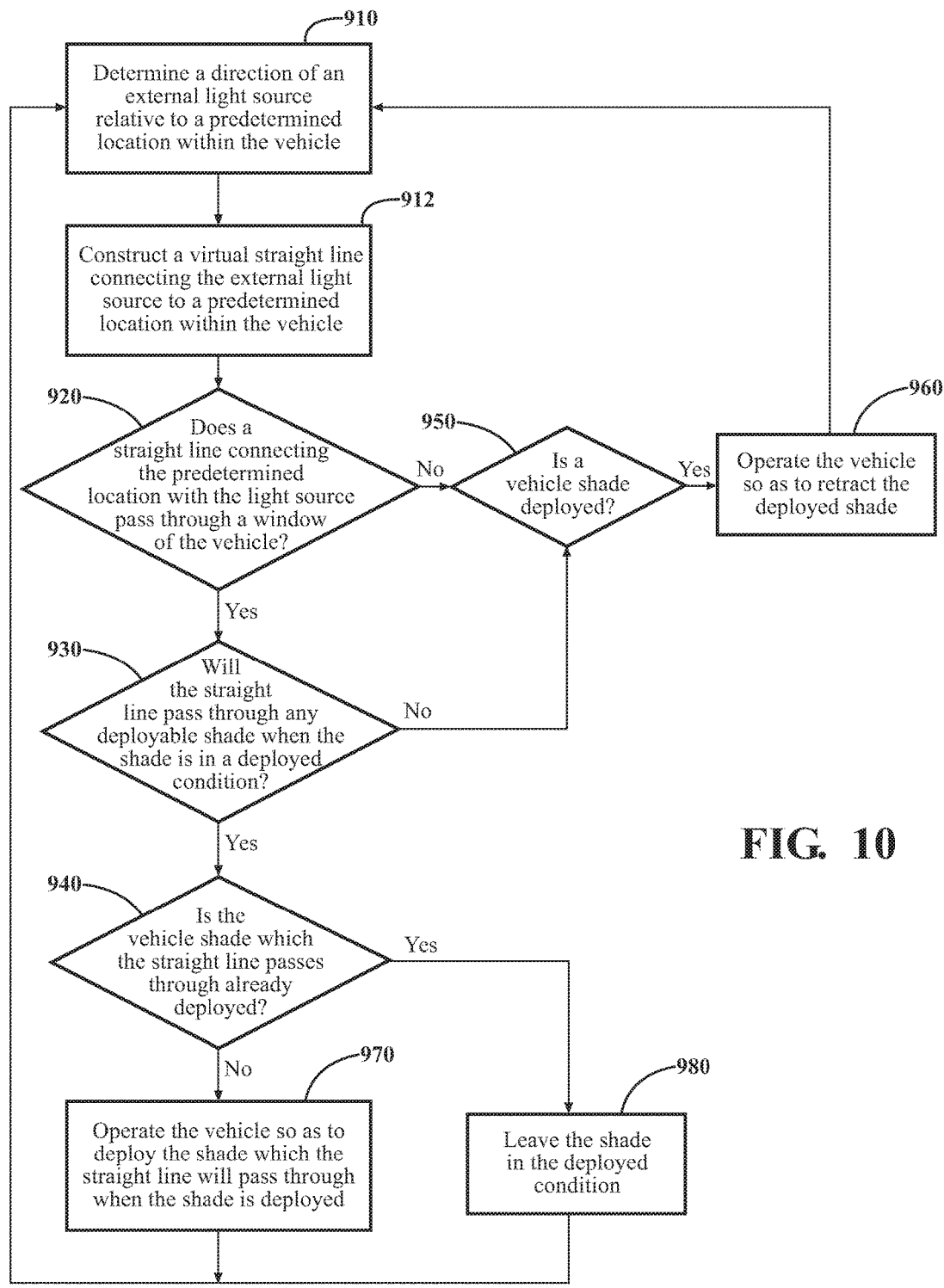
FIG. 10 is a flow diagram illustrating operation of a shade system in accordance with an embodiment described herein.

FIG. 10 is a flow diagram illustrating operation of a shade system in accordance with an embodiment described herein, and illustrating a method of operating a vehicle incorporating one or more automatically deployable vehicle shades, using computing system 14, sensor system 28, and any other devices and/or systems as described herein.

In block 910, the direction of a light source (such as the Sun) external to the vehicle relative to a predetermined location within the vehicle (for example, P1) may be determined. In block 912, a virtual straight line L1 connecting the external light source to a predetermined location P1 within the vehicle may be constructed. In block 920, it may be determined whether the straight line L1 connecting the predetermined location and the external light source will pass through a window of the vehicle. If the straight line L1 extending from the predetermined location toward the external light source will not pass through a window of the vehicle, then there is no reason for a shade to be deployed. Then, in block 950, it may be determined if any vehicle shade is currently deployed. If the straight line L1 extending from the predetermined location toward the external light source will not pass through a window of the vehicle but a shade is still deployed, the vehicle may be operated in block 960 so as to automatically retract the deployed shade.

Referring back to block 920, if the straight line L1 extending from the predetermined location toward the external light source passes through a window of the vehicle, then, in block 930, it may be determined if the straight line L1 will pass through any deployable shade of the vehicle when the shade is in a deployed condition. If the straight line L1 will not pass through any deployable shade of the vehicle when the shade is in a deployed condition, there is no reason for a shade to be deployed because no deployed shade will lie along the line L1 to intercept the incoming direct light. Then, in block 950, it may be determined if any vehicle shade is currently deployed. If the straight line L1 will not pass through any deployable shade of the vehicle when the shade is in a deployed condition but a shade is still deployed (for example, to block light from a pose of the vehicle prior to a recent turn), the shade may be automatically retracted as previously described in block 960. However, if the straight line L1 will pass through any deployable shade of the vehicle when the shade is in a deployed condition, it may (in block 940) be determined if the vehicle shade which the straight line will pass through is already deployed. If the shade is already deployed, in block 980, the shade may be left in its deployed condition. If the shade is not already deployed, in block 970, the vehicle may be operated so as to deploy the shade which the straight line L1 will pass through when the shade is deployed.

The computing system 14 may also be configured to execute instructions stored in the memory to operate the vehicle so as to deploy the shade or retract the shade responsive to receipt of a manual control command from a vehicle occupant. In certain embodiments, any of the vehicle shades described herein may be deployed manually by a vehicle occupant using the manual shade system control 199. Manual deployment of the shade may be desirable, for example, when attempting to prevent or mitigate glare of scattering of light impinging upon a window due to dirt on a windshield. In addition, the computing system may be configured to store in memory deployment information relating to each manual shade control command. Such information may include, for example, condition information such as vehicle GPS coordinates at the time of execution of a manually-initiated deployment or retraction, and the date and/or time of day at which manual deployment or retraction was initiated. The deployment information may also include such information as which shade(s) were affected by the manual shade control command, whether the affected shades were deployed or retracted, and any other pertinent information relating to the manual control commands executed while traveling along a route. The computing system may also be configured to use the stored manual deployment information to "teach" or inform the computing system 14 regarding when and where en route one or more shades may be automatically deployed or retracted in the future when traveling along the same route. For example, in a particular operational mode, the computing system may compare current condition information (i.e., current vehicle GPS coordinates, date and/or time information, etc.) with stored deployment information relating to previous manual shade deployment commands. If the current condition information matches stored deployment information (within certain tolerance limits, for example, with regard to GPS position coordinates), the computing system may automatically repeat or re-execute one or more shade control commands (for example, deployment or retraction of certain shades) which were previously executed manually at the same location and date and/or time of day, in accordance with the matched stored deployment information. Thus, when a match is found, the computing system may execute the previously manually-actuated control command(s) corresponding to the matched stored deployment information.

As will be appreciated by one skilled in the pertinent the art upon reading the disclosure, various aspects described herein may be embodied as a method, a computer system, or a computer program product. Accordingly, those aspects may take the form of an entirely hardware embodiment, an entirely software embodiment or an embodiment combining software and hardware aspects. Also disclosed herein are non-transitory computer readable media with stored instructions. The instructions could be executable by a computing system or device to cause the computing system or device to perform functions similar to those described in the methods described herein.

The flow diagrams and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A computing system for a vehicle, the computing system comprising one or more processors for controlling operation of the computing system, and a memory for storing data and program instructions usable by the one or more processors, wherein the one or more processors are configured to execute instructions stored in the memory to:
    construct a virtual straight line connecting a predetermined location within a vehicle with a light source external to the vehicle;
    determine spatial coordinates of locations on a plane defining at least one vehicle window;
    determine if the virtual straight line passes through the at least one vehicle window, by determining if spatial coordinates of any location on the plane defining the at least one vehicle window coincide with spatial coordinates of any point on the virtual straight line;
    if the virtual straight line passes through the at least one vehicle window, determine if the virtual straight line will pass through any deployable vehicle shade if the deployable vehicle shade is deployed; and
    if the virtual straight line will pass through any deployable vehicle shade if the shade is deployed and the shade through which the virtual straight line will pass is not already deployed, operate the vehicle so as to deploy the deployable vehicle shade through which the virtual straight line will pass if the shade is deployed.

2. The computing system of claim 1 wherein the one or more processors are configured to execute instructions stored in the memory to:
    determine a direction of the light source external to the vehicle relative to the predetermined location within the vehicle; and
    using the direction, construct the virtual straight line connecting the external light source with the predetermined location within the vehicle.

3. The computing system of claim 2 wherein the one or more processors are configured to execute instructions stored in the memory to continuously or regularly determine the direction of the light source relative to the predetermined location within the vehicle, to continuously or regularly use the direction to update the virtual straight line connecting the external light source with the predetermined location within the vehicle, and to continuously or regularly determine if the straight line connecting the external light source with the predetermined location within the vehicle passes through a window of the vehicle.

4. The computing system of claim 1 wherein the light source external to the vehicle is a star.

5. The computing system of claim 1 wherein the one or more processors are configured to execute instructions stored in the memory to:
    if the straight line does not pass through a window of the vehicle, determine if any vehicle shade is deployed; and
    if any vehicle shade is deployed, operate the vehicle so as to retract the deployed shade.

6. The computing system of claim 1 wherein the one or more processors are configured to execute instructions stored in the memory to:
    if the straight line will not pass through any deployable shade when a shade is deployed, determine if any vehicle shade is deployed; and
    if any vehicle shade is deployed, operate the vehicle so as to retract the deployed shade.

7. The computing system of claim 1 wherein the predetermined location within the vehicle is a point defined by an intersection of a vertical plane bisecting a driver's seat of the vehicle, a horizontal plane located at a predetermined distance above a seating surface of the driver's seat, and a predetermined horizontal distance from a front windshield of the vehicle.

8. The computing system of claim 1 wherein the one or more processors are configured to execute instructions stored in the memory to operate the vehicle so as to deploy the deployable vehicle shade or retract the deployable vehicle shade responsive to receipt of a manually-actuated shade control command.

9. The computing system of claim 8 wherein the one or more processors are configured to execute instructions stored in the memory to:
    store deployment information relating to each manually-actuated shade control command;
    compare current condition information with the stored deployment information; and
    if the current condition information matches stored deployment information, automatically execute a previously manually-actuated control command corresponding to the matched stored deployment information.

10. A shade system structured to be actuatable to block or attenuate light emanating from an extra-vehicular light source so as to shine through a window to a predetermined location in an interior of a vehicle, the shade system comprising:
- a housing;
- at least one deployable vehicle shade mounted in the housing; and
- at least one deployment mechanism coupled to the at least one deployable vehicle shade and operable to automatically move the at least one deployable vehicle shade between a deployed condition and a stowed condition,
- wherein the at least one deployable vehicle shade includes at least one cutout configured to facilitate airflow over a windshield of the vehicle and through the at least one shade when the at least one shade is deployed.

11. The shade system of claim 10 wherein the at least one deployable vehicle shade is structured to deploy to a horizontal distance from an end of a roof of the vehicle, the distance being equal to approximately one half of a vertical height of a window over which the at least one shade is positioned to extend when the at least one shade is deployed.

12. The shade system of claim 10 wherein the at least one deployable vehicle shade comprises a visor structured to project in a direction away from the vehicle when the visor is in a deployed condition.

13. The shade system of claim 10 wherein the at least one deployable vehicle shade is a shade which is deployable in a direction toward a front of the vehicle.

14. The shade system of claim 13 wherein the shade system includes at least a second deployable vehicle shade which is deployable in a direction toward a first side of the vehicle.

15. The shade system of claim 14 wherein the shade system includes at least a third deployable vehicle shade which is deployable in a direction toward a second side of the vehicle opposite the first side.

16. The shade system of claim 10 wherein the at least one deployment mechanism comprises at least one cylinder.

17. The shade system of claim 16 wherein the at least one cylinder is a telescoping cylinder.

18. A shade system structured to be actuatable to block or attenuate light emanating from an extra-vehicular light source so as to shine through a window to a predetermined location in an interior of a vehicle, the shade system comprising:
- a housing;
- a first deployable vehicle shade mounted in the housing and a second deployable vehicle shade mounted in the housing; and
- at least one deployment mechanism coupled to the first deployable vehicle shade and to the second deployable vehicle shade,
- the second deployable vehicle shade being configured to be deployable independently from the first deployable vehicle shade, the first deployable vehicle shade having a first opacity, the second deployable vehicle shade having a second opacity different from the first opacity,
- wherein the at least one deployment mechanism is operable to automatically independently move each of the first deployable vehicle shade and the second deployable vehicle shade between respective deployed conditions and stowed conditions, such that the second deployable vehicle shade is spaced apart from and overlies the first deployable vehicle shade when the first deployable vehicle shade and the second deployable vehicle shade are in their respective deployed conditions.

19. A method of operating a vehicle incorporating one or more automatically deployable vehicle shades, the method comprising steps of:
- determining a direction of an external light source relative to a predetermined location within the vehicle;
- constructing a virtual straight line connecting the external light source with a predetermined location within the vehicle;
- determining spatial coordinates of locations on a plane defining at least one window of the vehicle;
- determining if spatial coordinates of any location on the plane defining the at least one window of the vehicle coincide with spatial coordinates of any point on the virtual straight line;
- if spatial coordinates of any location on the plane defining the at least one window of the vehicle coincide with spatial coordinates of any point on the virtual straight line, determining if the straight line will pass through any deployable vehicle shade if the deployable vehicle shade is deployed;
- if the straight line will pass through a deployable vehicle shade if the deployable vehicle shade is deployed, determining if the deployable vehicle shade through which the straight line will pass is already deployed; and
- if the deployable vehicle shade through which the straight line will pass is not already deployed, operating the vehicle so as to deploy the deployable vehicle shade through which the straight line will pass if the deployable vehicle shade is deployed.

* * * * *